United States Patent
Paramesh et al.

(10) Patent No.: US 10,886,999 B2
(45) Date of Patent: Jan. 5, 2021

(54) RECONFIGURABLE HYBRID BEAMFORMING MIMO RECEIVER WITH INTER-BAND CARRIER AGGREGATION AND RF-DOMAIN LMS WEIGHT ADAPTATION

(71) Applicant: CARNEGIE MELLON UNIVERSITY, Pittsburgh, PA (US)

(72) Inventors: Jeyanandh Paramesh, Pittsburgh, PA (US); Susnata Mondal, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 16/902,957

(22) Filed: Jun. 16, 2020

(65) Prior Publication Data

US 2020/0313749 A1    Oct. 1, 2020

Related U.S. Application Data

(62) Division of application No. 16/163,374, filed on Oct. 17, 2018, now Pat. No. 10,707,947.

(60) Provisional application No. 62/707,024, filed on Oct. 17, 2017.

(51) Int. Cl.

| H04B 7/08 | (2006.01) |
|---|---|
| H04B 1/00 | (2006.01) |
| H04B 1/16 | (2006.01) |
| H04B 7/0413 | (2017.01) |

(52) U.S. Cl.
CPC .......... *H04B 7/088* (2013.01); *H04B 1/0028* (2013.01); *H04B 1/0078* (2013.01); *H04B 1/16* (2013.01); *H04B 7/0413* (2013.01)

(58) Field of Classification Search
CPC .... H04B 7/088; H04B 1/0028; H04B 1/0078; H04B 1/16; H04B 7/0413
See application file for complete search history.

(56) References Cited

U.S. PATENT DOCUMENTS

| 9,270,301 | B2 | 2/2016 | Vaisanen et al. |
|---|---|---|---|
| 9,614,662 | B2 | 4/2017 | Van der Goes et al. |
| 2006/0040709 | A1 | 2/2006 | Adachi et al. |
| 2006/0291589 | A1 | 12/2006 | Eliezer et al. |
| 2010/0099366 | A1 | 4/2010 | Sugar et al. |
| 2013/0102254 | A1 | 4/2013 | Cyzs et al. |
| 2014/0269864 | A1 | 9/2014 | Aparin |
| 2017/0331531 | A1 | 11/2017 | Wu |
| 2018/0331740 | A1* | 11/2018 | Orhan .............. H04B 17/102 |
| 2018/0351619 | A1* | 12/2018 | Khan .............. H04B 7/0617 |
| 2018/0359019 | A1* | 12/2018 | Han .................. H03D 7/165 |
| 2019/0089435 | A1 | 3/2019 | Mondal et al. |
| 2019/0222449 | A1* | 7/2019 | Subramanian .......... H04B 7/04 |
| 2019/0387504 | A1 | 12/2019 | Jung et al. |

* cited by examiner

*Primary Examiner* — Freshteh N Aghdam
(74) *Attorney, Agent, or Firm* — Kacvinsky Daisak Bluni PLLC

(57) ABSTRACT

A reconfigurable, multi-band hybrid beamforming architecture is introduced. The present invention is related to a Cartesian-Combining architecture to efficiently implement RF beamforming for a single downconversion chain employing direct downconversion in which the Cartesian-Combining architecture is extended to hybrid beamforming and to heterodyne downconversion.

20 Claims, 12 Drawing Sheets

(A)

(B)

(C)

Complex-weight comprising programmable-gain amplifier and programmable phase-shifter implemented using RF (orIF) circuits

RECONFIGURABLE HYBRID BEAMFORMING MIMO RECEIVER WITH INTER-BAND CARRIER AGGREGATION AND RF-DOMAIN LMS WEIGHT ADAPTATION

RELATED APPLICATIONS

This application is a divisional of U.S. patent application Ser. No. 16/163,374, filed Oct. 17, 2018, which claims the benefit of U.S. Provisional Patent Application No. 62/707,024, filed Oct. 17, 2017. The entire contents of these applications are incorporated herein by reference.

GOVERNMENT INTEREST

This invention was made with government support under contract ECCS-1343324 awarded by the National Science Foundation. The government has certain rights in the invention.

BACKGROUND OF THE INVENTION

Directional communication using electronically steered antenna arrays will be a key ingredient in future wireless networks in the traditional sub-6 GHz bands and in the new millimeter-wave frequency bands. In first-generation mm-wave networks (e.g. IEEE 802.11ad wireless LAN), phased-array beamforming is used to obtain a directional and steerable antenna pattern. Due to its simplicity and power efficiency, the RF beamformer architecture shown in FIG. 1. View (A) has emerged as the preferred approach to perform the algorithmically simple spatial signal processing required in a phased array, namely to apply programmable complex-valued weights to the signals received at the elements of an antenna array. Application of the complex-valued weights can be implemented in the RF-domain through one of several approaches including phase-shifter/variable-gain amplifier combinations, or through vector modulators as shown in view (B). Another approach is to use the Cartesian-combining architecture shown in view (C).

Advanced multi-antenna-based spatial signal processing techniques are necessary to achieve higher spectral efficiency, network capacity and better interference management in future millimeter-wave networks. The digital beam-former architecture shown in FIG. 2 offers the highest flexibility in implementing such spatio-temporal signal processing. However, the high power consumption of the local oscillator (LO) distribution network, data converters and digital signal processing makes digital beamforming infeasible for a large number of antenna elements. Hybrid beamformers seek to strike a compromise by performing the bulk of the spatial processing for a large number of antennas at RF, along with a handful of downconversion chains to facilitate digital spatio-temporal processing. There are two types of hybrid beamformers—the "partially-connected or sub-array" type (i.e., PC-HBF) of FIG. 3 and the "fully-connected" type (i.e., FC-HBF) of FIG. 4. The fully-connected type can offer superior performance when compared to the partially-connected type at the expense of greater implementation complexity. The partially-connected type can be implemented using existing RF-domain phased arrays such as the one shown in FIG. 1 while implementations of the fully-connected type are not previously known in the literature.

It is anticipated that future millimeter-wave networks will be deployed in several widely separated bands. So far, the 28, 37, 39, 45, 57-71, 71-76, 81-86, and 94 GHz bands have been identified for commercial use. Deployment of standards will initially be in a few of the lower frequency bands, but the use of increasingly higher frequency bands will be necessary to address the anticipated demand for capacity and data rates. Another likely scenario is the adoption of different frequency bands in different regions. Therefore, we anticipate the need for reconfigurable, flexible beamformers that can operate in a reconfigurable manner in many widely separated frequency bands.

SUMMARY OF THE INVENTION

Herein is described a reconfigurable, multi-band, fully-connected hybrid beamforming architecture. The architecture has $N_R$ inputs (corresponding to $N_R$ antennas) with No downconversion chains. The signal received at each of the $N_R$ antennas is optionally amplified by a low-noise amplifier (LNA).

Complex-weights, one for every downconversion chain, may be applied to the output of each LNA, or directly to the signal received from the antennas. The complex weights may be applied using one of three alternative approaches. In a first embodiment, a cascade of a phase-shifter and a variable-gain amplifier may be used. In a second, alternative embodiment, the complex weights may be applied using a vector modulator. In a third, alternative embodiment, one pair of programmable gain amplifiers per downconversion chain may be used to apply the complex weights. Following complex weighting using any of the above embodiments, the signals from the individual chains from each antenna are combined (i.e., summed), and then applied to the inputs of the $N_D$ downconversion chains.

The weighted signals can be combined in different ways, for example, by summing currents or by summing voltages or by using power combiner circuits. Furthermore, the combiner can be split into multiple stages, and a different combining topology can be used in each stage.

The circuitry preceding the first mixer stage is designed to support a bandwidth spanning $(f_L, f_H)$. Each downconversion chain may incorporate an independent local oscillator (LO) generation circuit, as shown in FIG. 5. The architecture of the present invention allows complete flexibility in the selection of frequencies and streams in each downconversion chain. For example, if the LO generation circuits are configured to generate and distribute $N_D$ distinct LO frequencies to the first stage mixers in the $N_D$ chains, the architecture behaves like $N_D$ independent phased arrays at each frequency between $f_L$ and $f_H$. As another example, if all LO generation circuits are configured to produce the same frequency, then $N_D$ distinct streams can be supported by the $N_D$ downconversion chains.

Non-image-reject embodiments hold for the case when a single LO generation circuit is shared between all $N_D$ downconversion chains. Each of the $N_D$ downconversion chains can be reconfigured into three non-image-reject modes, NIR1 NIR2 and NIR3. In NIR1, simple (non-quadrature) downconversion is performed in the first stage mixer pair, and full (complex-valued) downconversion is performed in the second stage. The advantage of this configuration is that quadrature generation of the high frequency first local oscillator is not necessary, thereby simplifying its generation and distribution. The disadvantage of NIR1 is that the beamforming operation is not completed until the output of the second stage. In other words, no spatial filtering is achieved prior to the input of the second stage. Therefore, interferers arriving from directions other than the main lobe direction are not attenuated until the output of the second stage which necessitates high-linearity mixers in the first as well as the second stages.

In the NIR2 mode, signals are weighted by the real and imaginary path amplifier, summed with a quadrature first LO and then combined in the first stage. This is followed by quadrature downconversion in the second mixing stage.

In the NIR3 mode, signals are weighted by the real and imaginary path amplifier. A complex-quadrature downconversion is performed in the first mixing stage, followed by simple (non-quadrature) downconversion in the second mixing stage.

The pros and cons of modes NIR2 and NIR3 are the opposite of NIR1. Precise quadrature generation is required in the first stage. Imperfections in quadrature generation lead to vector combining with non-90° vector combining, which leads to errors in the complex-weighting function. However, since the beamforming is completed at the output of the first stage, any interferers are spatially filtered prior to the second stage mixing quad, thereby easing its linearity requirements.

Each downconverter can be configured into one of two image-reject modes IR1 or IR2, as shown in FIG. 6, using a single first-stage LO frequency $f_{LO1}$. In this mode, one of two desired frequency channels $f_{RF,HI}$ and $f_{RF,LO}$ in two distinct frequency bands can be received while the other is rejected. To do so, an LO with frequency $f_{LO1}$ is chosen such that $f_{LO1}=(f_{RF,HI}+f_{RF,LO})/2$. By configuring the sign of the summation at the output of the mixing stages, either $f_{RF,HI}$ or $f_{RF,LO}$ can be received and the other rejected.

A subset of downconverters ($N_U$ in number) among the total $N_D$ downconverters can be configured into an lower-sideband image-reject mode and the remaining $N_L$ ($=N_D-N_U$) downconverters can be configured into a upper-sideband image-reject mode to downconvert only $f_{RF,HI}$ or $f_{RF,LO}$, respectively (where $f_{RF,HI}$ and $f_{RF,LO}$ denote two desired frequency channels in two distinct bands).

The image-reject configurations achieve perfect image rejection only with ideal quadrature LO signals (i.e., LO signals of equal amplitude and exactly 90° phase difference). In practice, both LO1 and LO2 will have quadrature errors. Calibration circuitry is necessary to separately correct quadrature errors in each mixing stage.

A quadrature error correction scheme is described herein which detects the quadrature error in the first stage using a pair of mixers, then uses a digital control loop to actuate a correction mechanism inside the RF-domain weighting amplifiers to correct for quadrature phase errors. Quadrature amplitude errors are eliminated by using limiting amplifiers between the LO generating circuit and the mixer.

Two methods are described to adaptively adjust the beamforming complex-weights to optimize the beam pattern under a minimum mean-square error (MMSE) constraint. Techniques to achieve this goal are well-known for digital beamformers but the lack of access to sampled/baseband signals from each individual antenna makes these techniques infeasible. The two techniques are called Double-Sampling Time-Multiplexed LMS (DS-TM-LMS) and Multi-Stream Time-Multiplexed LMS (MS-TM-LMS), and enable dynamic MMSE adaptation in hybrid beamformers.

BRIEF DESCRIPTION OF THE DRAWINGS

FIG. 11, view (B) is a block schematic diagram of a MS-DM-LMS adaptation.

DETAILED DESCRIPTION

Presented herein is a fully-connected hybrid beamforming mm-wave multiple-input, multiple-output (MIMO) receiver with two key innovations. The invention is explained by describing a four antenna, two stream implementation using 28/37 GHz. It should be realized that this embodiment is exemplary only, and that the scope of the invention is meant to cover implementations using any number of antennas producing multiple streams at multiple frequencies.

First, the receiver can be configured into three modes: two single-band multi-stream modes at 28 or 37 GHz that can support single- or multi-user MIMO, and a concurrent 28/37 GHz dual-band single-stream phased-array inter-band carrier-aggregation mode. In all modes, the receiver features full-connectivity from each antenna element input to each output stream, thereby maximizing usage of the available aperture. Second, the digitally programmable RF beamforming weights can be controlled by an external serial interface, or by an on-chip mixed-signal adaptation loop that implements one of two possible "time-multiplexed" least-mean square (LMS) algorithms—the double-sampling time-multiplexed LMS (DS-TM-LMS) or the multi-stream time-multiplexed LMS (MS-TM-LMS).

Unlike conventional LMS-type adaptation algorithms that require access to the individual array inputs and the combined output and are therefore not easily amenable to a hybrid beamformer, both algorithms update the RF-domain weights by accessing only the combined downconverted array outputs. Such adaptation is valuable for adaptive main-lobe, side-lobe or null steering, but more importantly, it can assist or augment codebook-based beam acquisition/tracking algorithms, which may fail in the presence of multipath, on- or off-channel interferers.

Figure 6:
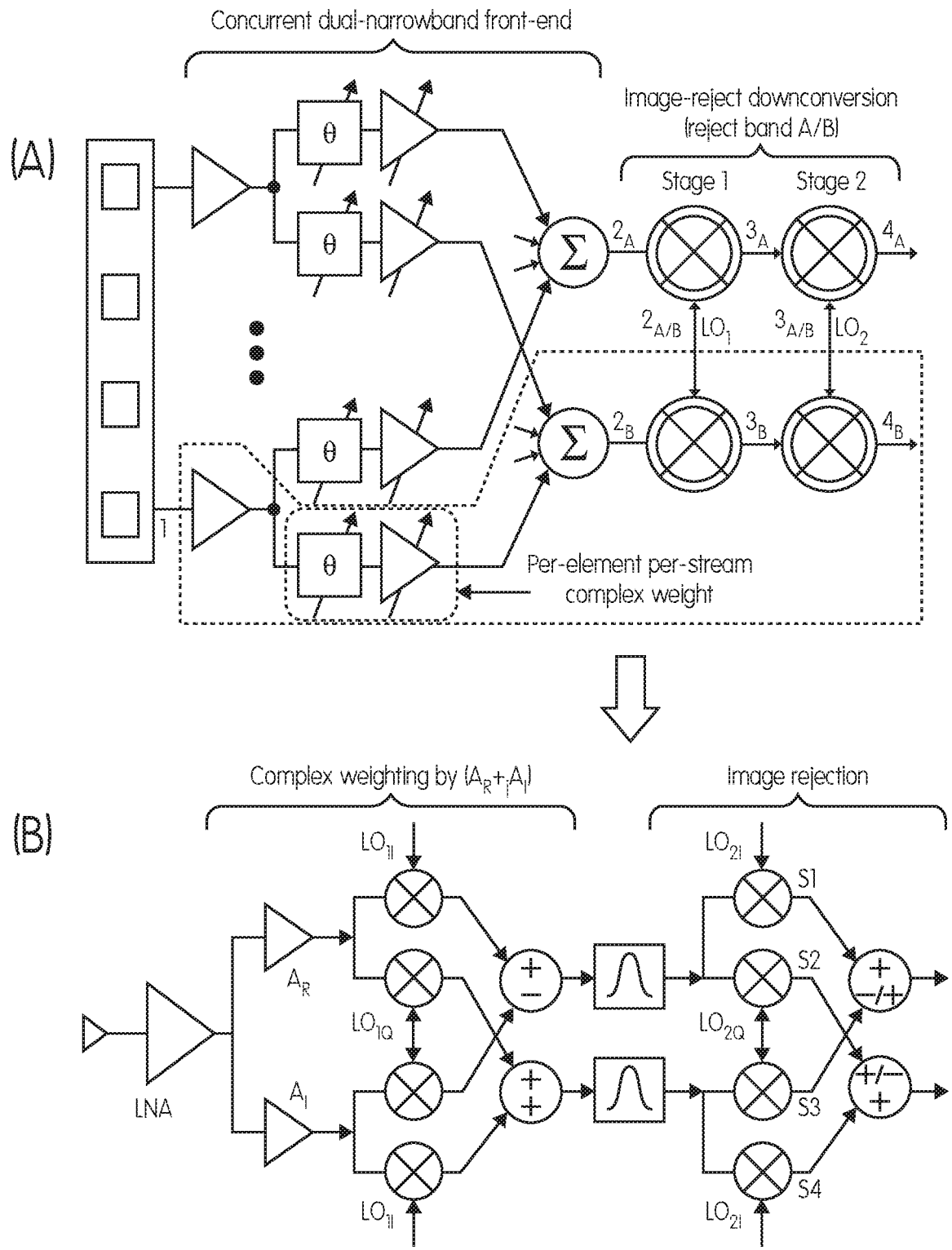
FIG. 6, view (A) is a block schematic diagram of a simplified architecture of a concurrent dual-band beamforming receiver in accordance with the present invention, showing, in view (B), image-reject complex-mixing based Cartesian complex-weighting, allowing concurrent dual-band RF phase shifting.

A simplified architecture of the four-element, two-stream RF beamforming receiver of the present invention is shown in FIG. 6. This embodiment, although showing an embodiment using IR mode, can be reconfigured, as described below, to operate in any one of the described NIR modes. In each element, a concurrent dual-band (or, alternatively, a wideband) LNA is shared between the two streams. Each stream comprises 28/37 GHz dual-band per-element, per-stream complex-weights, and signal combiners. This is followed by two image-reject downconverters (one per stream) which select either the lower or the higher band using high-side or low-side LO injection, respectively. While the frequencies of the desired signals in the two bands can, in general, be chosen to be at some offset from their image locations, independent LO's would be required for each downconverter, which adds complexity. Here, the desired signals in the two bands are chosen to be at the image frequency of each other. This allows the LO generation circuitry to be shared between the downconversion chains, which facilitates inter-band carrier aggregation without hardware overhead. It is important to note that any interferer can be attenuated by spatial filtering or null steering. For interference at the image location, this image-reject architecture enables additional suppression. The Cartesian-combining technique is well-suited to implement programmable RF-domain complex weighting at two widely separated frequencies. The complex weights are set by the gain ratio of a pair of programmable-gain amplifiers (PGA) in conjunction with complex-quadrature downconversion, and therefore do not require frequency-selective elements unlike conventional phase-shifters. In FIG. 6, Cartesian complex weighting is applied at the output of the first mixing stage, while the cascade of the two mixing stages enables image-rejection.

The functional schematic of FIG. 6 shows the proposed fully-connected hybrid beamformer (FC-HBF) receiver that supports independent complex-weighting from 28 GHz and/or 37 GHz band received at each antenna to each of two heterodyne downconversion chains. There are three major considerations in the implementation of this architecture. First, the front-end must have a suitable frequency response to support the required bands. A contiguously wideband circuit that covers the widely separated bands under consideration can be designed but poses significant challenges. An alternative approach is to design the front-end circuit to have a "dual-band" frequency response in the two bands under consideration. Second, a generalized application of the Cartesian-combining architecture for multiple streams may employ direct downconversion with independent LO generation circuitry in each downconversion chain. While direct downconversion may advantageous in some respects, the LO would need to cover a very wide frequency range spanning the two widely separated bands. Generation and distribution of the LO in such an architecture is a challenging task.

Alternatively, a heterodyne version of the Cartesian-combining architecture is advantageous since the required LO range is smaller. The disadvantage is that the image-frequency interference must be suppressed through combination of appropriate frequency planning and choice of mixing architecture. Third, RF-domain complex-valued beamforming weights must be applied, and the weighted signals combined at two widely separated frequencies. Current phased arrays employ different types of phase shifters which typically have relatively limited bandwidth, in addition to their other shortcomings. The aforementioned challenges are addressed in this design using several techniques which are summarized next.

Through appropriate choice of coupling coefficient, coupled resonator loads can be used in the front-end circuits including the LNA, PGA's and the combiner to design for either a dual-band or a contiguously wideband frequency response, as described above.

Figure 10:
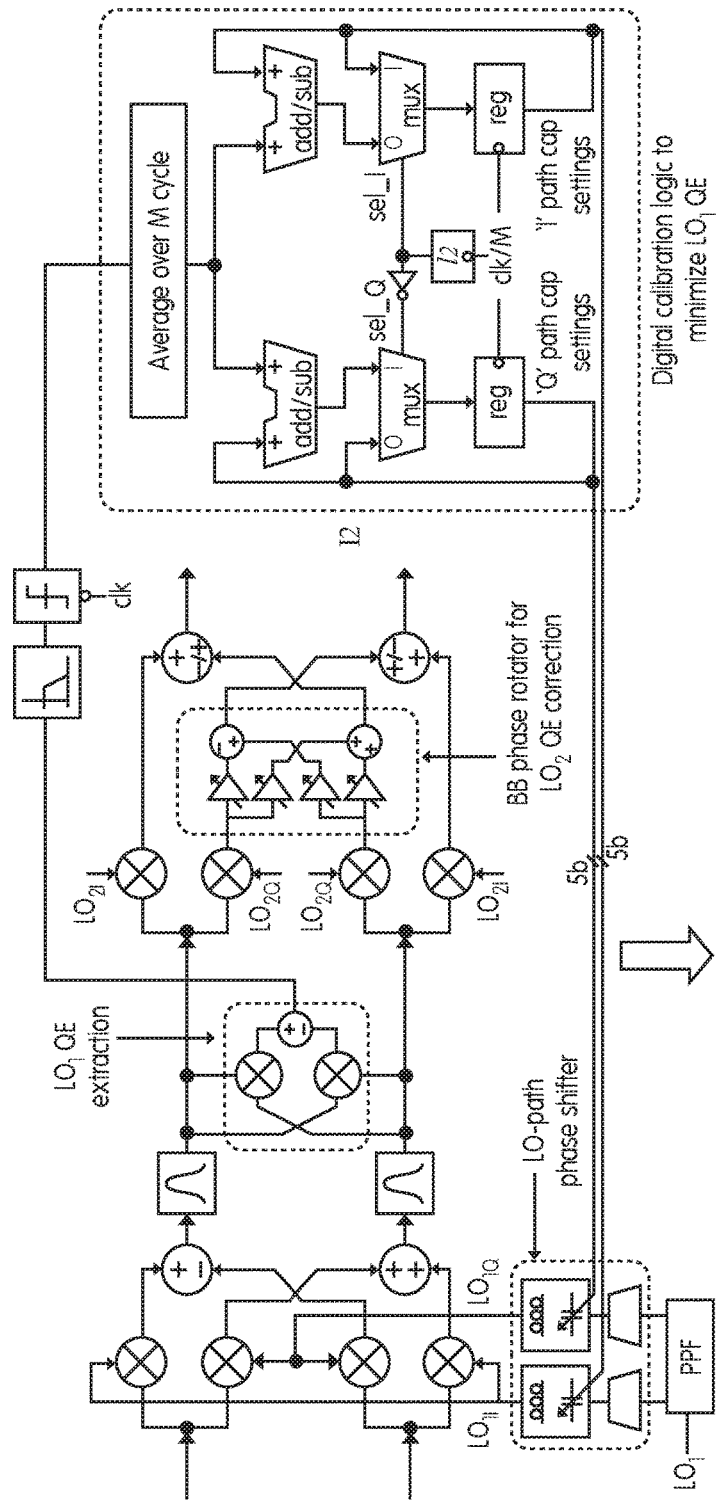
FIG. 10 shows the $LO_1$ quadrature error extraction, calibration and correction (at LO-path) and $LO_2$ quadrature error correction at BB.
Figure 10:
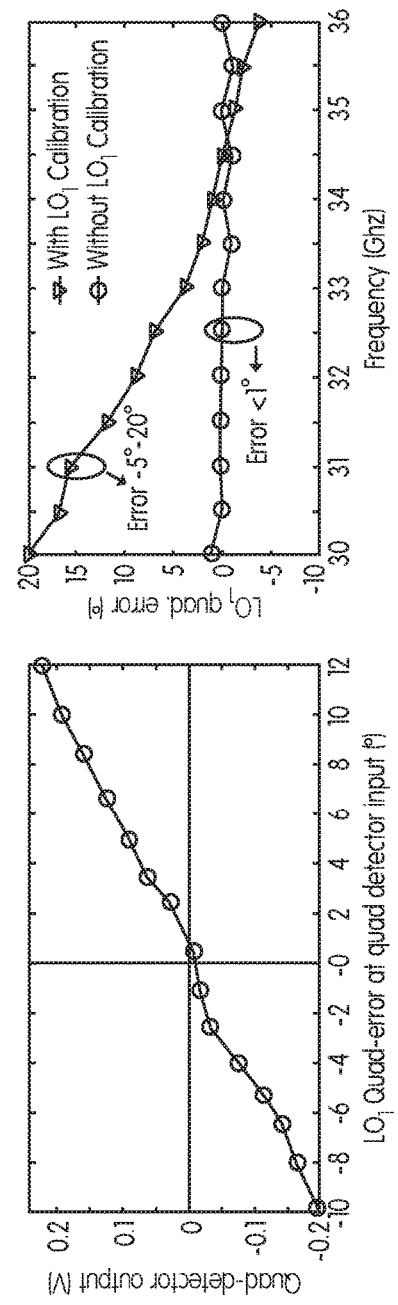

A dual-band heterodyne architecture with image-reject downconversion stages is introduced. The LO frequency is chosen such that the desired signal bands are located at their mutual image frequency locations. The image-reject mixers can be configured to reject the low-side (or high-side)-band in each stream with the same LO. This allows seamless reconfiguration between concurrent dual-band CA mode, where one downconversion path is configured to reject high-side-band (37 GHz) and other to reject low-side-band (28 GHz), and two multi-stream MIMO modes, where both the downconversion paths are configured to reject high-/low-side-band. Inset of FIG. 10 shows the signal spectrum at different parts of the multi-mode HBF in carrier aggregation (CA) mode. It can be seen that image-band interferer gets rejected using two mechanisms—by front-end null-steering, and by image-reject downconversion.

A dual band RF-beamforming technique is introduced. The aforementioned architecture can be generalized and developed into several different variations. The proposed receiver can be reconfigured amongst all the variations including an image-reject variant to support different modes.

Complex Weighting and Downconversion Principle

Figure 1:
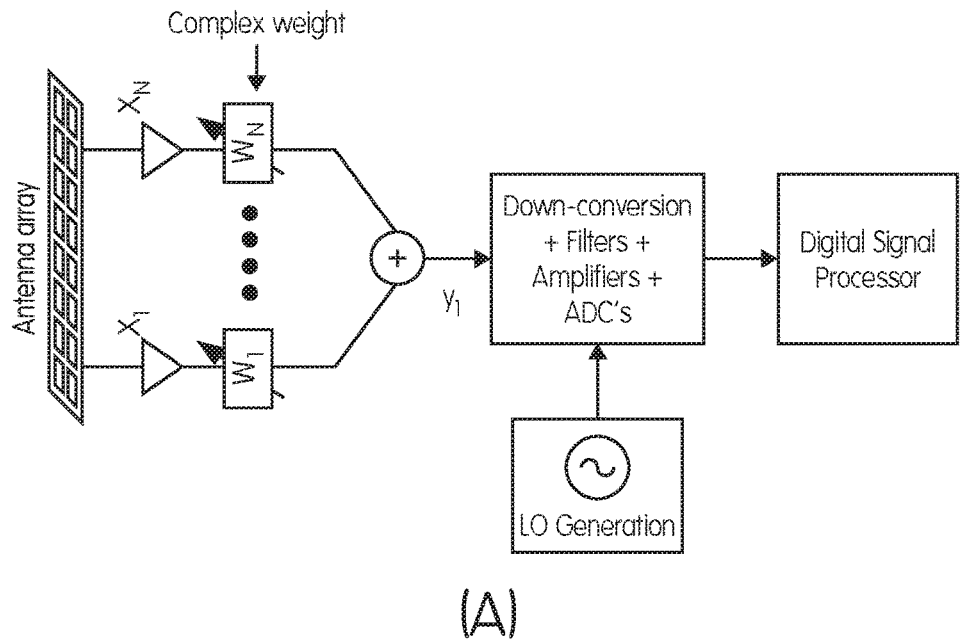
FIG. 1 is a general schematic diagram of a prior art RF beamformer architecture.
Figure 1:
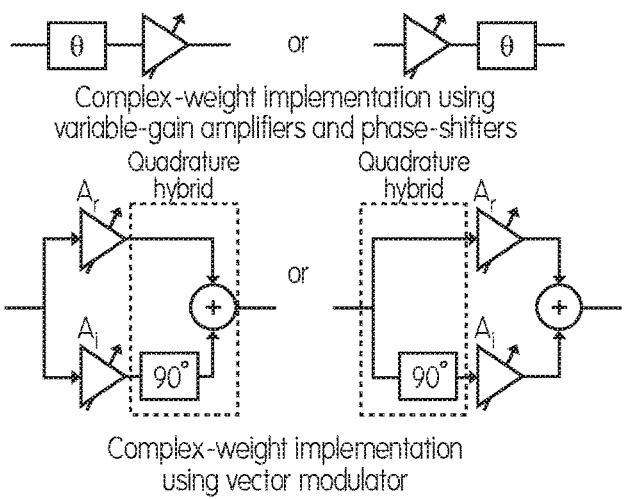
Figure 1:
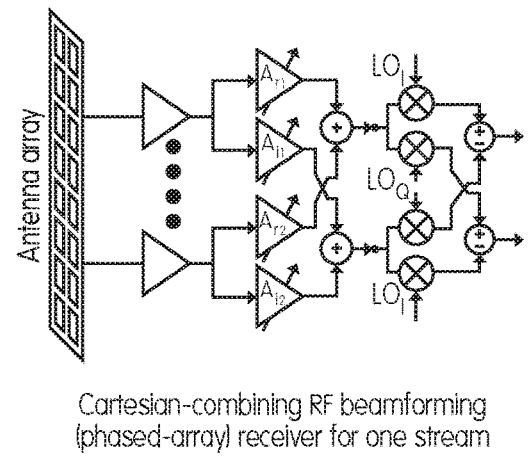
Figure 2:
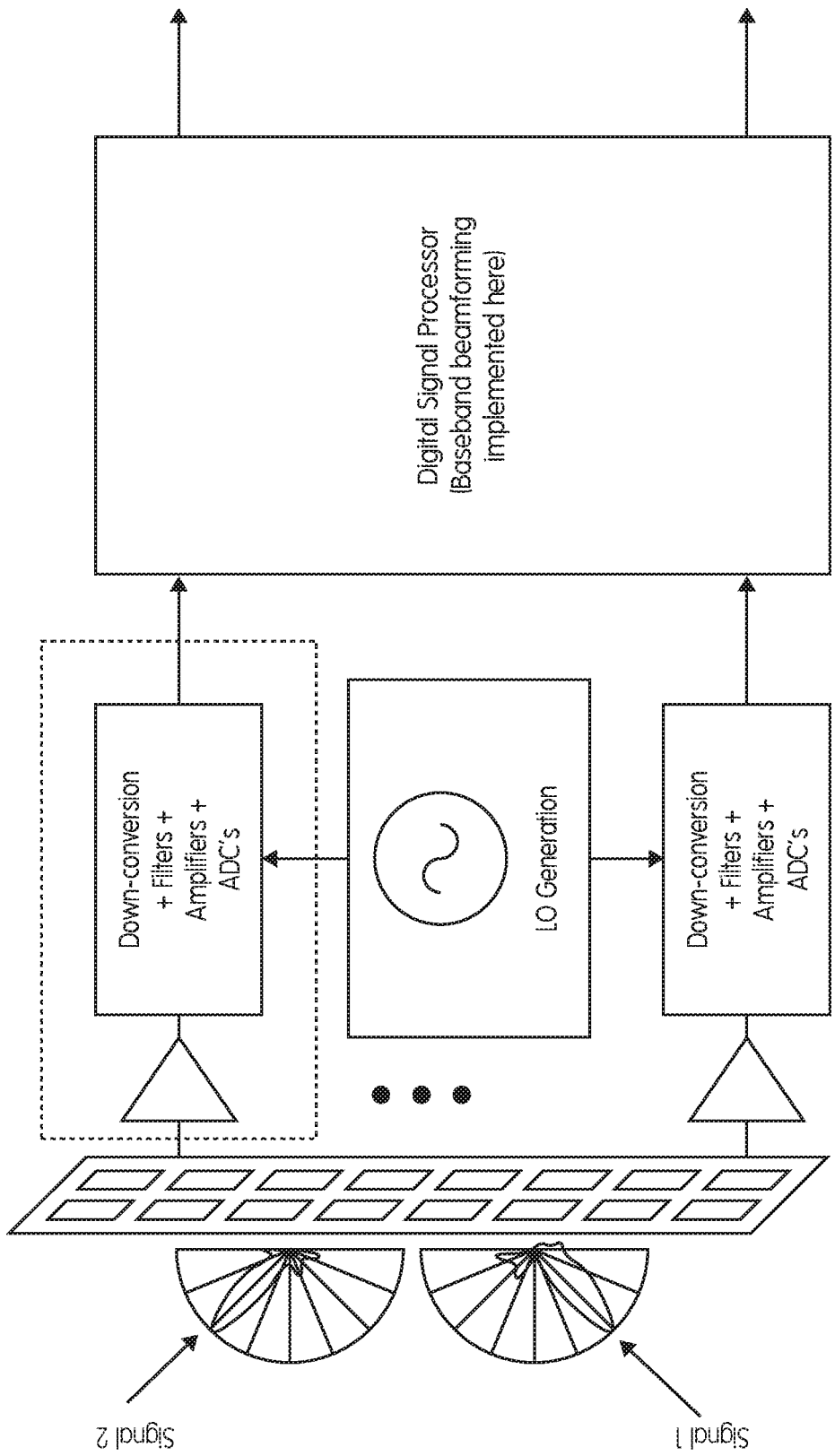
FIG. 2 is a general schematic diagram of a prior art digital beamforming receiver.
Figure 3:
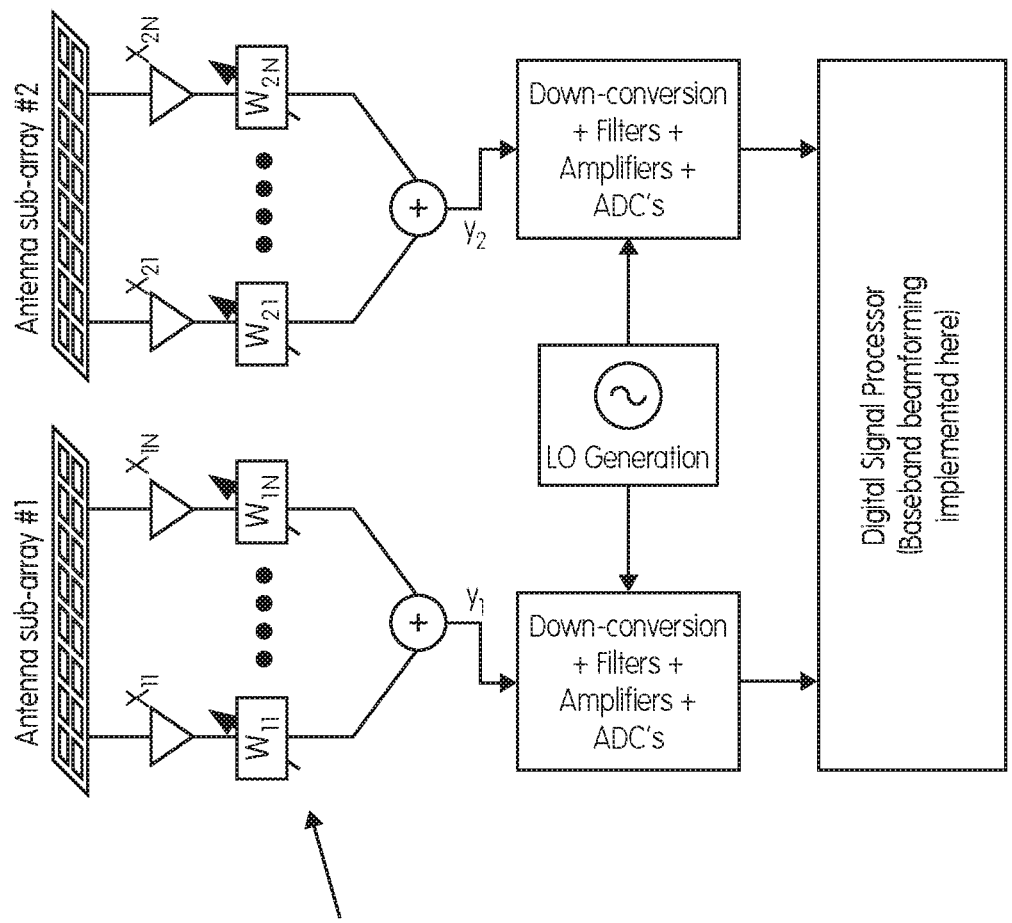
FIG. 3 is a general schematic diagram of a prior art partially-connected hybrid beamforming receiver.
Figure 4:
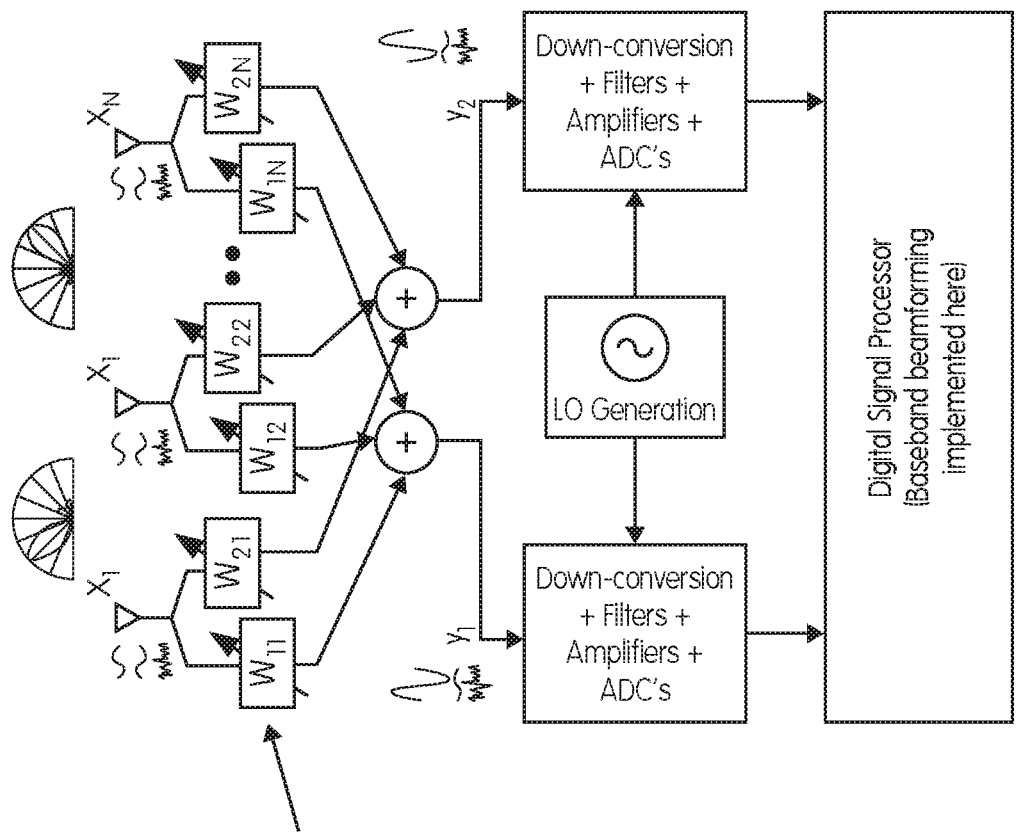
FIG. 4 is a schematic diagram of a prior art simplified receiver implementing the fully-connected hybrid beam former architecture that combines complex-weighted signals from antennas prior to downconversion and digitization through multiple downconversion chains. The concept is illustrated here for two downconversion chains but can be generalized to any number.
Figure 5:
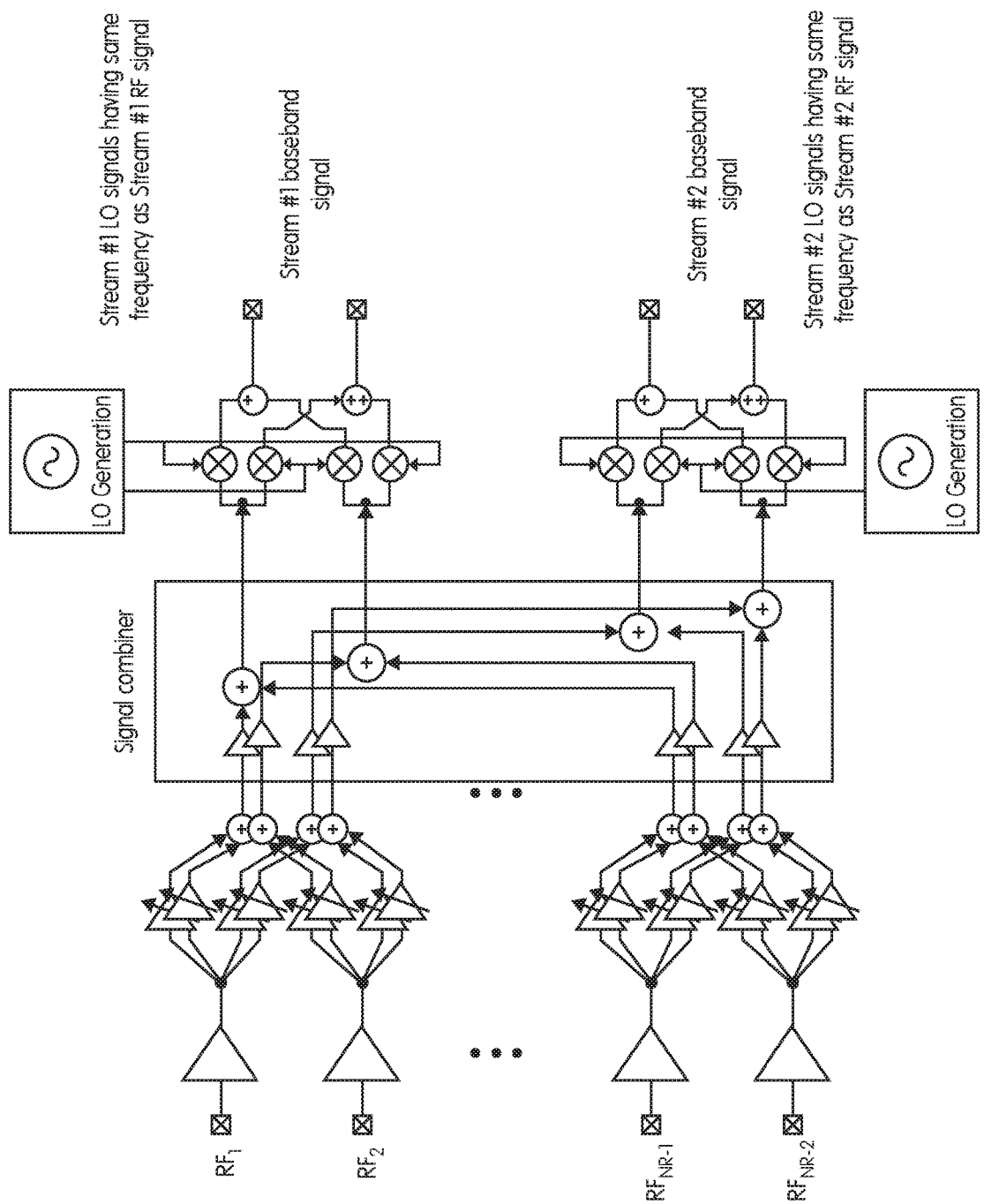
FIG. 5 is a block schematic diagram of a simplified architecture of a fully-connected hybrid beamforming receiver in accordance with the present invention, showing the Cartesian-combining architecture to perform independent complex-weighting from each antenna element to each of several downconversion chains, followed by direct downconversion in each downconversion chain.

This technique has its roots in a Cartesian combining technique which uses a pair of programmable-gain amplifiers (PGA) and a complex-quadrature direct downconversion mixer to perform complex weighting (for RF beamforming) and RF-to-baseband conversion. This principle was then elegantly extended to a single-stream beamforming receiver by invoking signal path linearity to sum the complex weighted signals from each antenna element before complex-quadrature downconversion, thereby allowing significant simplification in the LO distribution network. The Cartesian combining technique was extended in two ways: (1) by introducing a particular approach (shown in view (B) of FIG. 2) to combine complex-weighting with heterodyne down-conversion, and (2) by introducing a FC-HBF architecture for multi-stream reception.

Figure 7:
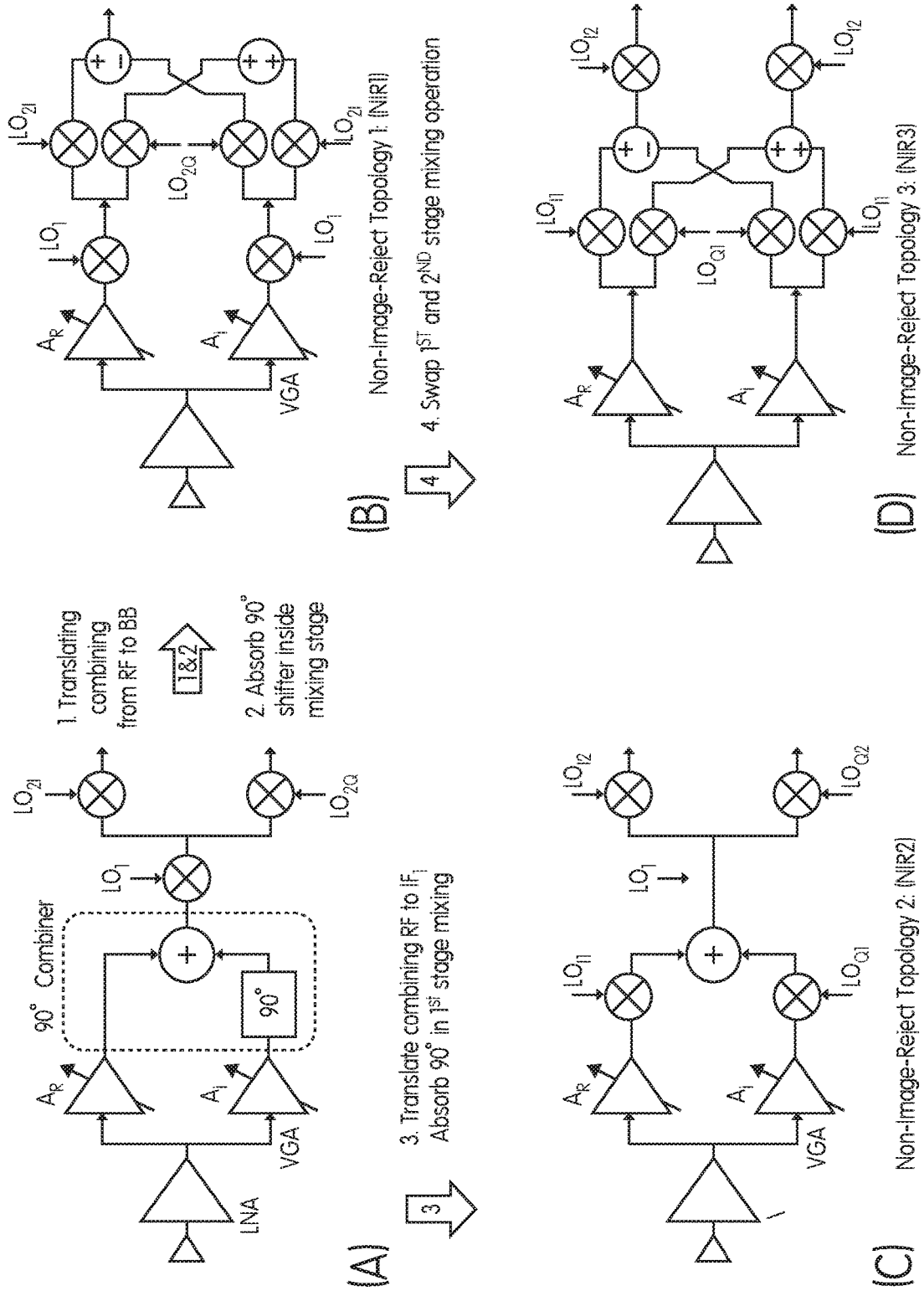
FIG. 7 shows several different architectures for non-image-reject (NIR) heterodyne Cartesian phase shifting with vector modulator in view (A), complex quadrature mixing in second stage—NIR1 in view (B), complex mixing in first stage and quadrature mixing in second stage—NIR2 in view (C), and complex quadrature mixing in first stage—NIR3 in view (D).

The evolution of the proposed architectures is described starting with the structure shown in view (A) of FIG. 7 where complex-weighting is performed by a 90° combiner (i.e., a quadrature hybrid) and a pair of PGA's, and is followed by heterodyne downconversion. Typical implementations of the 90° combiner have several undesirable properties for on-chip implementation, including high loss, large area, limited bandwidth and need for matching at the ports. To eliminate an explicit 90° combiner, the architectures, shown in views (B)-(D) of FIG. 7 and views (A)-(C) of FIG. 8 can be used.

Non-Image-Reject (NIR) Architectures

In FIG. 7, view (A), the first downconversion uses a simple mixer, and does not offer image rejection. The architectures shown in FIG. 7, views (B)-(D) are derived from the architecture shown in FIG. 7, view (A) and are therefore termed "non-image-reject" (NIR). The NIR1 architecture shown in FIG. 7, view (B) can be derived from FIG. 7, view (A) by translating the combiner from RF to baseband, and by absorbing the 90° phase shifter block in the second mixing stage. NIR2, shown in FIG. 7, view (C) can be realized by translating the combining from RF to IF, and by absorbing the 90° phase shifter block in the first mixing stage. NIR3, shown in FIG. 7, view (D), can be realized from NIR1 by commutating two mixing stages.

These architectures have different advantages and challenges. NIR1 does not require high-frequency quadrature LO signals in the first mixing stage; however, since the Cartesian phase shifting operation is completed only after the second mixing stage, both mixer stages are exposed to blockers. On the other hand, in both NIR2 and NIR3, Cartesian complex-weighting is completed after the first stage of mixing; however, quadrature generation is necessary for the high-frequency LO. Comparing NIR2 and NIR3, NIR2 uses the fewest mixers, but it requires quadrature LO signals in both mixing stages.

Image-Reject (IR) Architectures

In the multi-mode reconfigurable FC-HBF, image rejection is essential in the CA mode, and desirable to suppress image-frequency interference in the other two modes. An image-reject architecture can be derived starting from the structure of FIG. 8, view (A), which comprises a vector modulator followed by a Hartley image-reject receiver. Two transformations can be performed in each mixing stage as follows: (1) the combining operation that precedes each mixer can be translated after the corresponding mixing stage, and (2) each 90° phase shifter can be absorbed in the subsequent mixing stage, as shown in FIG. 8, view (B).

Figure 8:
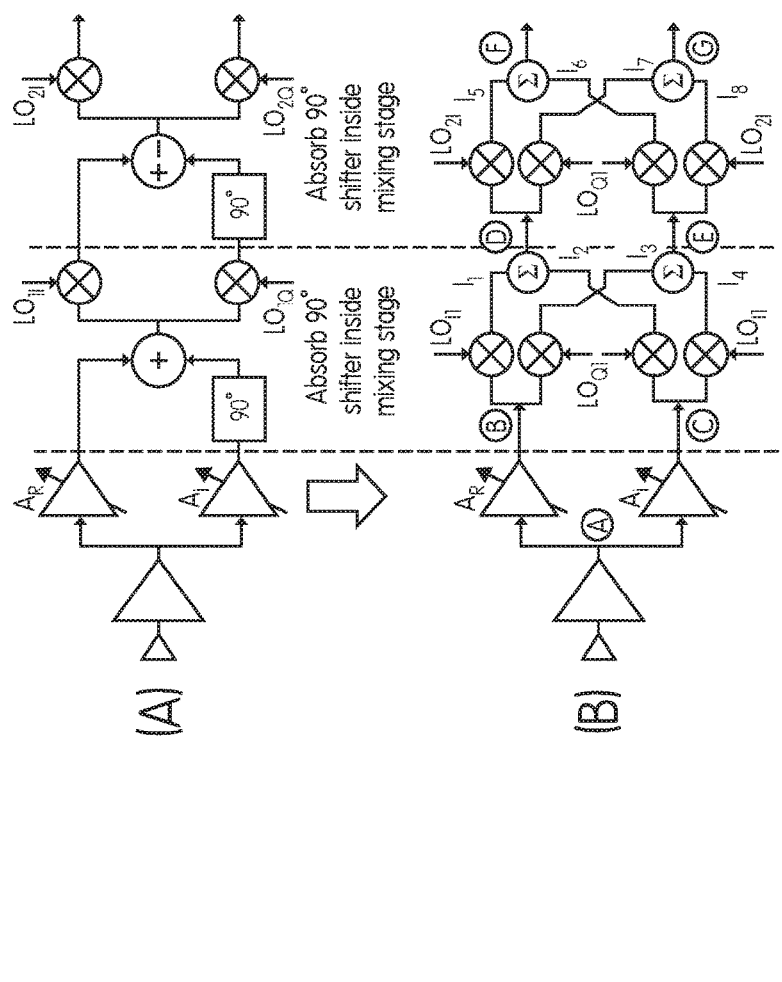
FIG. 8 shows several different architectures for image-reject (IR) Cartesian phase shifting with vector modulator followed by a "Hartley" receiver in view (A) and complex quadrature mixing in both stages in view (B).

The image-rejection mechanism of the IR architecture in FIG. 8, view (B) can also be understood mathematically by calculating signals at different nodes of the receive path, labeled A-to-G. To generalize the treatment to include the NIR modes, the signals in the mixer paths of FIG. 8, view (B) are multiplied by parameters $l_{1-8}$, where l=0 signifies that the corresponding mixer is turned OFF, and l=+1 or −1 denote the sign of the combining operation that follows the corresponding mixer. The signals at A-to-G can be written as shown in (1) at the bottom of the page. Input signals (A) in the high sideband ($f_{RFH}=f_{LO1}+f_{LO2}$) and low sideband ($f_{RFL}=f_{LO1}-f_{LO2}$) are represented in terms of their complex envelope $\tilde{x}_H(t)$ and $\tilde{x}_L(t)$, respectively. The table in FIG. 8, view (C) lists the baseband envelope for different settings of $l_{1-8}$.

Multi-Stream Cartesian-Combining FC-HBF

Figure 9:
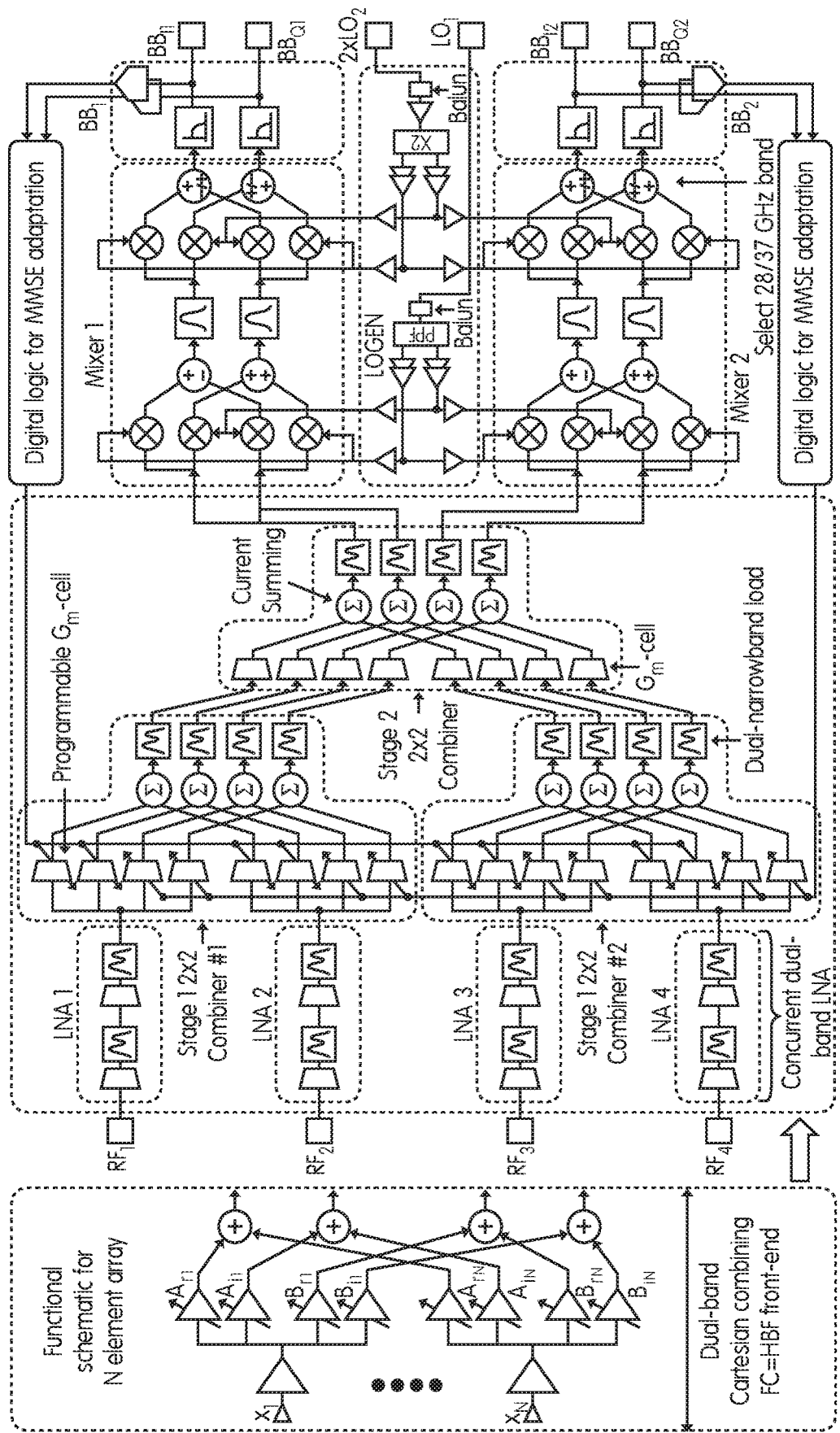
FIG. 9 is a block schematic diagram showing an exemplary dual-band Cartesian combining fully-connected hybrid beamforming receiver functional front-end structure and a detailed schematic of a four-element two-stream multi-mode adaptive hybrid beamformer prototype having stream #1 highlighted in blue and stream 2 highlighted in red.

The architectures NIR1-3 and IR can be extended to multiple antennas, resulting in the FC-HBF final receiver architecture of the present invention. The resulting structure is referred to herein as the Multi-stream Cartesian Combining FC-HBF. Specifically, to implement complex-weighting and image-reject heterodyne downconversion for multiple antennas for a single stream, the structure of FIG. 8, view (B) can be extended by using a pair of PGA's for each antenna in each stream and combining the corresponding PGA outputs. For one stream, this results in a structure shown in blue (or red) in FIG. 9. As a consequence of linearity in the RF signal path, the summation can be implemented at the input of the first mixing stage. Additional streams can be supported by replicating the structure depicted in blue (or red).

In an ordinary (i.e., non-Cartesian-combining beamformer) image-reject receiver, quadrature error (QE) in both mixing stages can be consolidated and corrected at BB. However, in a Cartesian-combining image-reject receiver, the first stage QE, when captured at BB, varies with weight settings. To maintain high image-rejection across all complex-weight settings, QE from each mixing stage should be calibrated separately. In the first stage, where significant QE is expected due to the high frequency and PPF-based quadrature generation, the following technique is used to extract and calibrate QE in LO1 separately.

First, the $LO_1$ QE is translated to IF (4.5 GHz in measurement) using the top mixer pair of first mixing stage, as shown in FIG. 10. The QE between two mixer outputs at IF is then converted to a voltage using a cross-coupled mixer pair (a step of ~20 mV/degree is shown in FIG. 10, as measured from a prototype). Cross-coupled mixers are used to equalize the loading at two IF outputs, and thus reduce imperfections due to RF and LO trace mismatches inside the QE-extraction circuit. The sign of the voltage representing the QE is extracted using a comparator and fed to a digital calibration engine which minimizes the average comparator output by increasing or decreasing the 5-bit control words of the capacitor banks in tuned-LC I/Q LO buffers, which can tune the I/Q phases with ~0.75°/LSB phase resolution. This calibration can reduce raw QE of over 20° in a 30-36 GHz LO frequency range to below 1° (See FIG. 10). The $LO_2$ QE is corrected at BB using a phase rotator. In some embodiments, calibration of the 2nd stage only may achieve >35 dB IRR for a limited number of complex weight settings, while calibration of both stages may result in >35 dB over the entire range of weights in both 28 and 37 GHz bands.

Time-Multiplexed LMS Beam Adaptation Algorithms

Real-time beam pattern adaptation schemes seek to dynamically adapt beamforming weights under an MMSE criterion. Conventionally, the weight update algorithm is expressed in terms of $$W(k+1)=w(k)-\mu\nabla_w[MSE] \quad (1)$$

where w is the weight vector, $\nabla_w[MSE]$ represents the gradient of the mean-square error MSE, and µ is the update rate. In general, real-time estimation of the gradient requires knowledge of the input to each element in the beamformer. For example, in the least-mean square (LMS) algorithm, the gradient is estimated by correlating the inputs x with the error between a "desired" signal d(k) and the beamformer output $w(k)^H x(k)$.

$$w(k+1)=w(k)-\mu x(k)[d(k)-w(k)^H x(k)]^H \quad (2)$$

Here, d(k) that can be obtained either from a training sequence or from symbol decisions during a decision-directed beam-tracking mode or from symbol decisions during a decision-directed beam-tracking mode following initial training. Implementation of this algorithm is straightforward in a digital beamformer, where all inputs to the beamformer are available in sampled-data form. However, its implementation in an RF/hybrid beamformer is problematic since the correlation involves sampling an RF signal (of which only the baseband content is of interest), its multiplication with a baseband desired signal, followed by integration.

Two solutions are described. Each is based on two key ideas: (1) The LMS updates of each weight are independent of other weights and can therefore be time-multiplexed by calculating one update per cycle. (2) Beamformer input data for a particular element can be extracted using by setting the complex weight in that path to unity ($1e^{j0}$) and setting all other weights to zero. This allows access to the baseband content of that input alone without requiring extra hardware.

Double-Sampling Time-Multiplexed LMS (DS-TM-LMS)—

Figure 11:
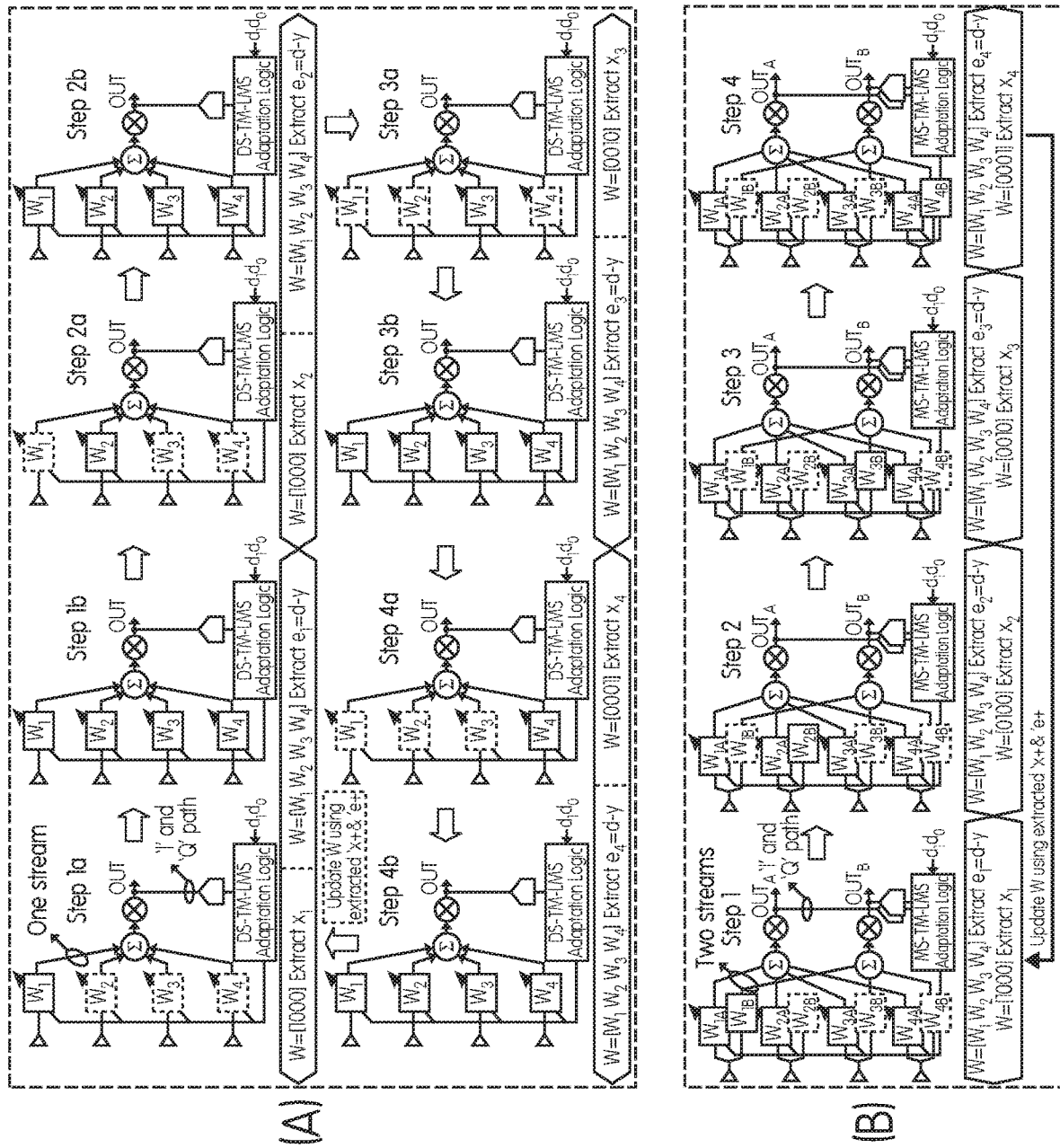
FIG. 11, view (A) is a block schematic diagram of a DS-TM-LMS adaptation.
Figure 12:
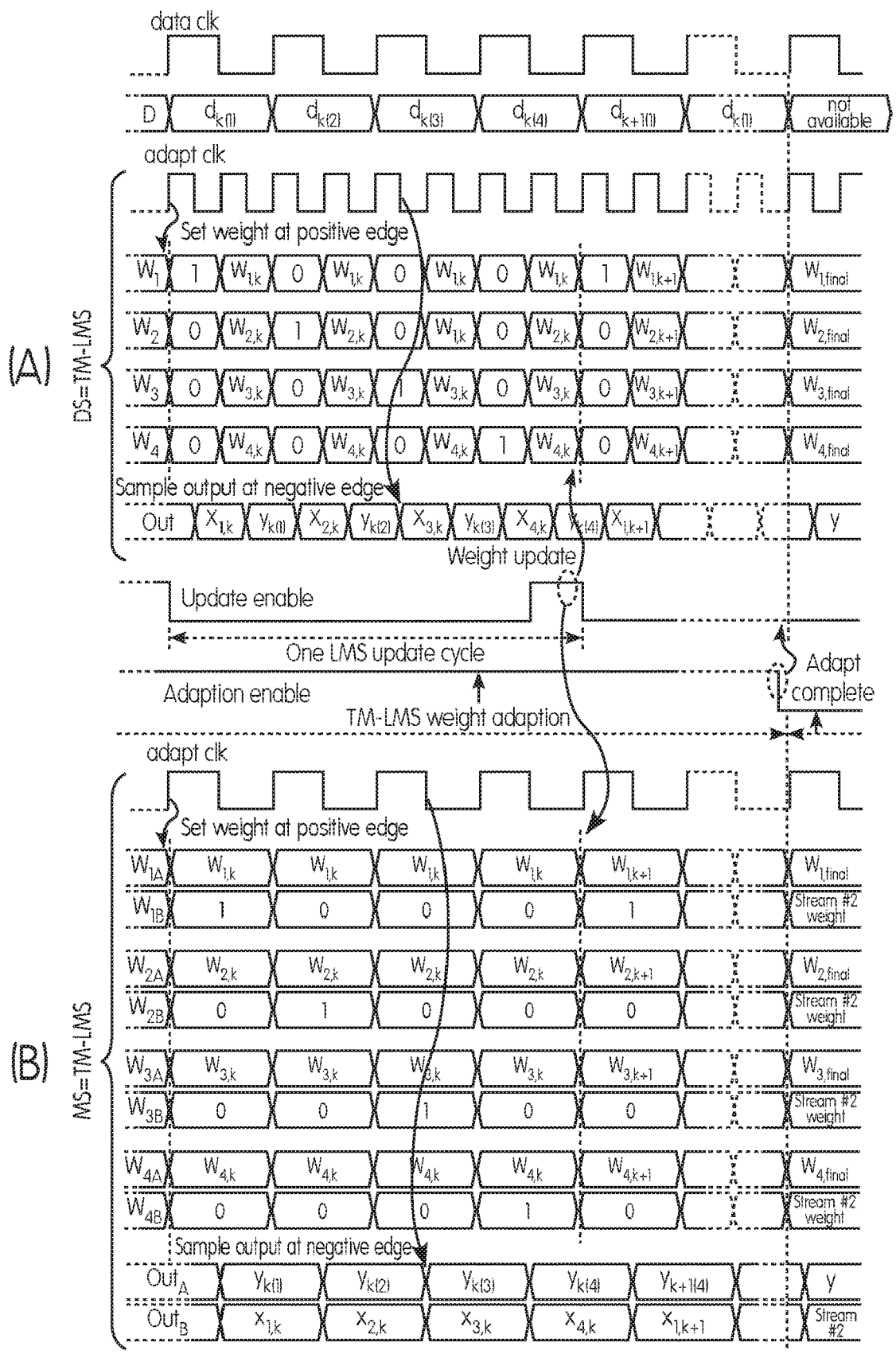
FIG. 12 shows timing diagrams for the DS-TM-LMS in view (A) and MS-TM-LDS adaptations in view (B).

This adaptation algorithm, shown in FIG. 11, view (A), is applicable to both single-stream phased-array, PC-HBF and FC-HBF receivers. It uses an adaptation clock running at twice the frequency of the symbol clock and operates as follows: (1) During each symbol period, weights are set twice, once at each positive edge of the adaptation clock. Baseband outputs are sampled twice, once at each negative edge of the adaptation clock, as shown in FIG. 12. (2) In the first half-cycle, the weight of only the $n^{th}$ element is set to unity and other weights are set to zero to extract $n^{th}$ element's input ($x_n$). (3) In the second half-cycle, the current set of weights w(k) is applied to all elements, and the output-error-gradient w.r.t. the $n^{th}$ weight is calculated from the beamformer output and the previously extracted $n^{th}$ input $x_n$ (i.e., computing the $n^{th}$ row of matrix equation (2)). (4) Error gradients with respect to all other weights are sequentially extracted (one per symbol period) in time-multiplexed fashion. (5) At the end of $N^{th}$ symbol periods (for an N element array) in the $k^{th}$ LMS update cycle, all the beamforming weights are updated to w(k+1), and the next [(k+1)$^{th}$] LMS update cycle starts. (6) The adaptation algorithm is terminated at the end of the training preamble in a data packet.

Multi-Stream Time-Multiplexed LMS (MS-TM-LMS)—

In an FC-HBF receiver, the availability of independently weighted downconversion chains from each antenna can be exploited for adaptation. This results in a second algorithm called Multi-Stream Time-Multiplexed LMS (MS-TM-LMS) which is illustrated in FIG. 11, view (B) for an FC-HBF with two chains. The beamforming weight of one chain (i.e., chain "A" in view (B) of FIG. 11) is adapted with the help of the other stream (i.e., chain "B" in view (B) of FIG. 11). Note that this is method is not possible in a PC-HBF since each downconversion chain in a PC-HBF accesses a different subset of antennas. The MS-TM-LMS algorithm works as follows: (1) In each symbol period, weights are set in both chains at the positive edge of the adaptation clock and the baseband outputs are sampled from both streams at the negative edge of the adaptation clock, shown in FIG. 12. (2) The weights in the auxiliary chain are set to extract $n^{th}$ input $x_n$. Weights in the main chain are set to their current values. The output error is calculated. Then, the output-error gradient with respect to the $n^{th}$ weight is calculated from the output error and $x_n$ both of which are extracted simultaneously. (3) Similar to DS-TM-LMS, error gradients with respect to all other weights are extracted sequentially; weights are updated once in each $N^{th}$ symbol period.

The availability of additional downconversion chains ($N_D$) in an FC-HBF can be exploited for multi-stream adaptation. Consider an example with $N_D$=4 chains. To adapt weights for one, two or three streams, one, two or three chains can be used as the main chains and the remaining three, two or one chains as auxiliary chains. Adaptation can also be performed for four streams, given four chains, but the DS-TM-LMS algorithm would have to be used instead.

Comparison Between DS-TM-LMS and MS-TM-LMS

Adaptation in RF/Hybrid BFs: The MS-TM-LMS technique be used only in FC-HBF receivers as more than one chains are necessary to extract beamformer input and error output simultaneously. On the other hand, DS-TM-LMS can a single-chain RF beamformer, PC- or FC-HBF's.

Beam Tracking: Both algorithms can support beam tracking by using the received beamformer output symbol as the "desired" signal for beam adaptation (i.e., decision-directed adaptation). However, in DS-TM-LMS, half the symbol period is used to extract the input signal, which adds perturbation noise into the signal path, potentially degrading the SNR. This is not a problem in MS-TM-LMS.

Adaptation Rate: Adaptation speed of MS-TM-LMS can be increased by increasing the number of auxiliary chains. For $A_R$ auxiliary chains, $A_R$ inputs can be simultaneously extracted which results in a speedup by $A_R$ times compared to a single auxiliary chain.

Hardware Overhead: DS-TM-LMS does not require extra hardware in the main signal path but requires twice the beam switching speed and baseband bandwidth of MS-TM-LMS. In MS-TM-LMS dedicated auxiliary chains are required, but only when beam tracking is desired.

To those skilled in the art to which the invention relates, many modifications and adaptations of the invention will suggest themselves. Implementations provided herein, including sizes, shapes, ratings and specifications of various components or arrangements of components, and descriptions of specific manufacturing processes, should be considered exemplary only and are not meant to limit the invention in any way. As one of skill in the art would realize, many variations on implementations discussed herein which fall within the scope of the invention are possible. Specifically, the invention is meant to include embodiments using any number of antennas producing multiple streams at multiple frequencies. Additionally, weighted signals can be combined in different ways, as described above. Accordingly, the method and apparatus disclosed herein are not to be taken as limitations on the invention but as an illustration thereof.

We claim:

1. A method for weight adaptation in a hybrid beamforming receiver having N antenna element inputs and M downconversion chains, comprising:
   receiving N inputs from the N antenna element inputs of the beamforming receiver using a symbol clock signal running at a first frequency and an adaptation clock signal running at a second frequency twice the first frequency;
   during each cycle of the symbol clock:
   a. extracting an $n^{th}$ input from the N inputs of N elements;
   b. applying a current set of weights to all N inputs;
   c. sampling a weighted output from an $m^{th}$ downconversion chain; and
   d. calculating an error gradient of a weight corresponding to the $n^{th}$ input;
   repeating steps a.-d. in subsequent cycles of the symbol clock until error gradients have been calculated corresponding to weights for said all N inputs; and
   updating the current set of weights based on the calculated error gradients corresponding to the weights for said all N inputs.

2. The method of claim 1 wherein the N-element beamforming receiver has the N inputs and one down-converted output.

3. The method of claim 2 wherein the $n^{th}$ input is extracted at a first positive edge of the adaptation clock during a current cycle of the symbol clock.

4. The method of claim 3 wherein the $n^{th}$ input is extracted by setting the weight for the $n^{th}$ input to unity and all other weights to zero.

5. The method of claim 1 wherein the current set of weights is applied to said all N inputs at a second positive edge of the adaptation clock during a current cycle of the symbol clock.

6. The method of claim 1 wherein the output of the N-element beamformer is sampled at each negative edge of the adaptation clock during the current cycle of the symbol clock.

7. The method of claim 1 wherein the error gradient for each $n^{th}$ weight is calculated as an error between a desired signal and an output of the beamformer.

8. The method of claim 7 wherein the error gradient for said each $n^{th}$ weight is calculated based on the equation:

$$W(k+1)=w(k)-\mu \nabla_W[MSE]$$

where:
- $w(k+1)$ is the updated weight (vector);
- $w(k)$ is the current weight (vector);
- $\mu$ is an update rate; and
- $\nabla_W[MSE]$ is the gradient of the mean square error.

9. The method of claim 7 wherein the desired signal is obtained from a training sequence.

10. The method of claim 1 wherein the weights in the set of weights for each input are complex weights.

11. The method of claim 1 wherein the N elements are part of a single-stream phased-array, partially-connected or fully-connected hybrid beamforming receiver.

12. A method for weight adaptation in a multi-stream, fully connected hybrid beamforming receiver having N antenna elements comprising:
receiving N inputs from the N antenna elements of the beamforming receiver using a symbol clock and an adaptation clock signal both running at the same frequency, each of the N-inputs having a at least one main chain and at least one auxiliary chain;
during each cycle of the symbol clock:
 a. extracting an $n^{th}$ input of the N-inputs;
 b. calculating an output error of a baseband output of the receiver;
 c. calculating an error gradient of weights corresponding to the $n^{th}$ input based on the $n^{th}$ input and the output error;
repeating steps a.-c. in subsequent cycles of the symbol clock until error gradients have been calculated corresponding to weights for said all N inputs; and
updating the current set of weights for one or more main streams based on the calculated error gradients corresponding to the weights for said all N inputs.

13. The method of claim 12 wherein each of the N-inputs has $N_D$ chains.

14. The method of claim 13 wherein M of the chains in each input are designated as main chains and $N_D$-M chains are designated as auxiliary chains.

15. The method of claim 12 wherein the $n^{th}$ input is extracted by setting the weight for the $n^{th}$ auxiliary chain to unity and all other weights for others of the auxiliary chains to zero.

16. The method of claim 14 wherein weights for one of one or more auxiliary streams are set at a positive edge of the adaptation clock during a current cycle of the symbol clock.

17. The method of claim 14 wherein weights for the one or more main streams of the $n^{th}$ input are set at a positive edge of the adaptation clock during a current cycle of the symbol clock.

18. The method of claim 14 wherein the baseband output is sampled at a negative edge of the adaptation clock during the current cycle of the symbol clock.

19. The method of claim 12 wherein the error gradients are calculated as an error between a desired signal and the baseband output.

20. The method of claim 19 wherein the desired signal is obtained from a training sequence.

* * * * *